June 16, 1942.  J. E. BUTLER  2,286,196
ALIGNMENT MECHANISM FOR RECORDING SCALES
Filed Aug. 1, 1940
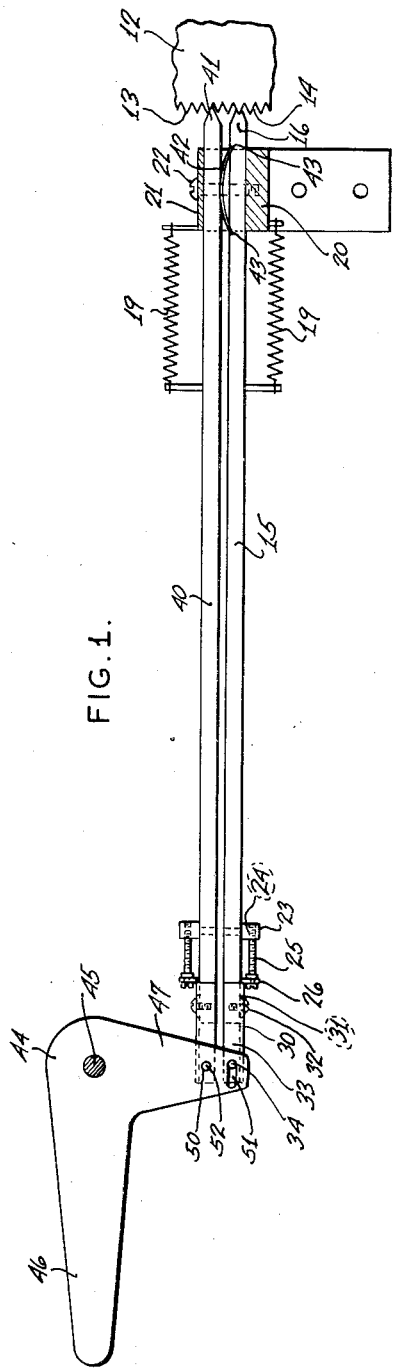
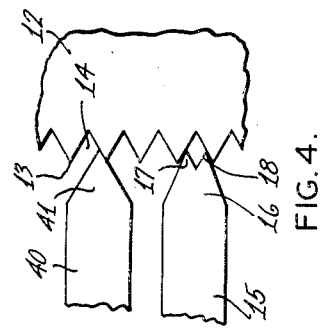
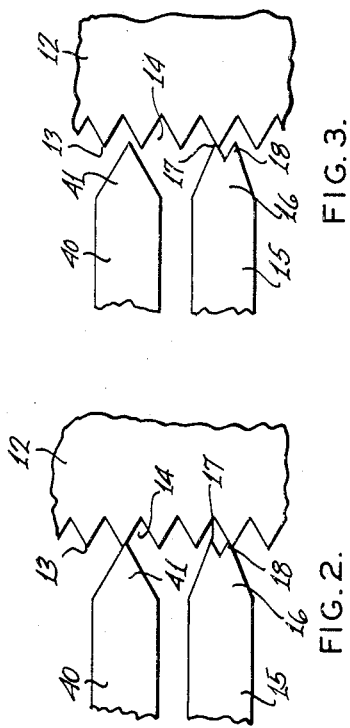
INVENTOR.
JAMES E. BUTLER
BY Paul L. Keohn
ATTORNEY.

Patented June 16, 1942

2,286,196

UNITED STATES PATENT OFFICE 2,286,196

ALIGNMENT MECHANISM FOR RECORDING SCALES

James E. Butler, Memphis, Tenn., assignor to Fairbanks, Morse & Co., Chicago, Ill., a corporation of Illinois Application August 1, 1940, Serial No. 349,259

6 Claims. (Cl. 265—5)

This invention relates to alignment mechanism for recording scales and more particularly to alignment fingers of the types employed for engagement with the star wheel or equivalent element of recording dial type scales.

Considerable difficulty has been heretofore experienced in mechanism of this class, due to the fact that an alignment finger of any of the types known to have been formerly employed, occasionally comes to rest and hangs on a tooth rather than in one of the notches or recesses between the teeth of a star wheel or locating disc. It may be noted that such disc is usually one of an assembly of discs, fixedly angularly related to each other and which assembly rotates with or in response to, say, the pointer shaft of a dial scale. When the noted condition obtains, and the locating disc or wheel is wrongly engaged, the locating finger thus prevents the various weight-sensing fingers from accurately reflecting, each from its respective disc, the accurate weight indicated by the pointer or dial of the scale. This condition thus results, in a recording and printing scale, in the registration of a false or inaccurate weight value. It is accordingly a general object of the invention positively to overcome errors of the kind and arising out of the cause above noted.

Yet another object of the invention is attained in a novel arrangement of multiple locating or alignment fingers such that the finger assembly is capable of effecting a slight angular displacement of the locating disc or star wheel prior to effective operative engagement of the weight value discs by their respective locating or sensing fingers, in such manner as to assure recording of correct weight values.

Yet another object is attained in the provision of both a main and an auxiliary alignment finger, the auxiliary finger serving to be directed by the cooperating main locating finger, into exactly the proper recesses or notch on the locating disc or star wheel, whereby to assure accuracy of function in the remaining discs and fingers of the sensing mechanism.

The foregoing and numerous other objects will more clearly appear from the following detailed description of a preferred embodiment of the invention, considered in connection with the accompanying drawing, in which:

Fig. 1 is a side elevation showing certain elements in section, of an alignment finger assembly including a fragmentary portion of a locating disc cooperating therewith, and an operating member for the finger assembly, and Figs. 2, 3 and 4 are diagrammatic showings, somewhat enlarged, illustrating certain typical conditions prevailing in the cooperation of the locating disc and fingers of the present assembly.

Referring now by characters of reference to the drawing, it is pointed out that the general arrangement of apparatus herein contemplated as exemplifying the invention, is or may be similar to that shown and described in Letters Patent No. 2,070,011, issued February 9, 1937, to H. A. Hadley et al. For purposes of present discussion and description there is provided, as indicated at 12, a locating disc or star wheel which is one of an assembly of discs including, for example, a units disc, a tens disc, hundreds disc and thousands disc, the several discs being assembled together and carried for example, by the dial indicator shaft so as to be rotated therewith, and to bear a constant angular relation to each other. The periphery of the star wheel or locating disc 12 is characterized by a plurality of evenly spaced teeth 13, intervened by a plurality of spaces or V-shaped notches 14.

Guidedly mounted for reciprocatory movement in a path to and from the periphery of the locating disc 12, is a main alignment finger 15. This is preferably made in the form of a rod, and its free end, being the one nearest the star wheel 12, is tapered so as to present a somewhat pyramidal form, the pyramidal portion 16 terminating in a pair of spaced edge or apexed portions 17 and 18, intervened by a V-shaped notch. It is preferred, as will be noted from the drawing, that the spacing of the apices 17 and 18 is somewhat less than the spacing of the apices resulting from teeth 13 on the star wheel 12.

The rod or finger 15 is kept in its operative path by means of a suitable fixed support 20 on which the member 15 is slidably disposed, the guiding function of the support 20 being completed through a plate 21 which may extend across the finger 15 and auxiliary finger thereabove, later to be described, as well as the group of the several weight-selecting fingers (not shown) and utilized for example, as indicated in the Hadley patent above designated. The plate 21 may be suitably positioned by screws 22 or similar holding elements. For the purpose of providing a slight bias of the main and auxiliary finger, a small coil type tension spring 19 is provided for each thereof, the springs being conveniently anchored to the elements 20 and 21 as shown.

The finger or rod 15 extends rearwardly or away from the locating disc to a length adjustment device through which may be made initially, and during service periods as required, changes in the effective length of the main finger 15. For the purpose of adjustment the arrangement best exemplified in Fig. 1 consists of a post 23 provided with a tapped aperture 24 to receive an adjustment screw 25; the head of the screw 25 extends through and is journaled in an apertured upturned portion 26 which is part of a strap member 30. The strap 30 is slotted as at 31 to receive a holding screw 32 engaging a tapped aperture in the finger 15. The strap 30 is extended to form a carrier and support for a U-shaped member 33, the flanges of which are extended still further rearwardly and are apertured to receive a finger operating pin or pivot 34. It will be apparent that by loosening screw 32, and threading the screw 25 in or out of the post 23, the pin 34 may be brought either closer to or farther from the locating disc 12, whereby to vary and adjust the total effective length of the finger 15.

Located on one side or the other of the main finger 15, preferably thereabove, is a companion or auxiliary finger 40 which may be formed of a rod stock similar to that constituting the finger 15, and like the latter, is characterized by a tapered pyramidal end portion 41, the latter however being provided with only a single edge or apex portion.

The finger 40 operates in a path substantially, but not always exactly, parallel to that of the finger 15. Its forward end or the one nearest the locating disc 12, extends beneath the bridge plate 21 of the guide structure 20—21.

In order to provide for and permit, at times, a slight convergence of the main and auxiliary fingers 15 and 40, the two are biased toward parallelism, and a fixed spaced relation therebetween tends to be maintained by virtue of a very thin bow-spring 42, the latter having its ends preferably recessed in suitable notches 43 therefor, in one or the other of the fingers, say in the finger 15. Thus the bow spring moves at all times with the finger 15 and tends to keep the fingers 40 and 15 with their outer ends in the maximum spaced relation permitted by their guide elements 20—21. Such spacing is very small, and need be only that approximating the distance between adjacent teeth 13 on the wheel or disc 12.

The auxiliary finger 40 may, if desired, be provided with an adjustment for its effective length, similar to that heretofore described in connection with finger 15; the parts of this adjustment being identical no separate description thereof is regarded as necessary in connection with the auxiliary finger.

A common operating member, usually known as an operating arm, is exemplified by a small bell crank lever indicated generally at 44, and being provided with a fixed pivot such as a pin or the like 45. The longer arm 46 of the bell crank is connected to suitable operating mechanism such as the cam-driven devices shown by the above mentioned Patent No. 2,070,011.

The shorter arm 47 of the operating arm is provided with a pair of apertures, one thereof being preferably circular, is indicated at 50, and the other slotted or elongate, preferably slightly arcuate in form, as indicated at 51, and constituting a lost-motion connection. The slot 51 serves to receive the operating pin 34 carried by the actuated end of the alignment finger 15, while the upper opening 50 serves to receive a similar operating pin 52 in and for actuating the finger 40. It thus appears that the two alignment fingers 15 and 40 are actuated by a common agency; viz., the arm 44. It will further appear that both fingers are positively mechanically actuated rather than, in certain devices, one finger being actuated from the other.

The manner of assembly of the parts, their original adjustments and settings, and function in operation are all thought to have been fully apparent from the foregoing description, but it may be briefly pointed out that at the time of initial assembly, it is considered important through the length adjustments provided, to advance the main locating finger slightly ahead of the companion auxiliary finger, say a distance of $1/16$ inch. It is also desirable that the main finger should contact the locating disc first, but that the auxiliary finger should also contact the disc ahead of the several weight-sensing fingers. It will be noted that the slotted opening 51 in the operating arm 44, compensates for the possible greater travel of the auxiliary finger at a given point setup of the main finger. Suitable adjustments of both of the fingers relative to the locating disc or star wheel, and relative to each other, may be made after a few experimenting trials.

There are shown by Figs. 2, 3 and 4 in the nature of diagrammatic showings, typical relative positions of the fingers and locating disc from which it will be noticed that the auxiliary finger 40 will always assume a position other than an edge-to-edge relation or off-apex position, as to a tooth of the locating disc, this being possible due to the provision for what may be termed an up-and-down movement between the finger 40 and its guiding elements.

When setting the device, the main locating finger is placed in its normal position at a given point setup, and the companion finger 40 is located slightly away from a position in which it would fully engage a notch between star wheel teeth, and when this finger is not absolutely at the end point of its travel. It is important so to adjust the fingers and related elements that the auxiliary finger 40 will take other than an edge-to-edge position with the wheel notches when the upper point of the main finger meets a point of the disc, and vice versa as to the lower point of the main alignment finger 15. From the diagrams of Figs. 2, 3 and 4 it will be seen as entirely possible and not unusual, that in the tendency of both fingers to assume a position as close as possible in engagement with the star wheel or locating disc, one or the other, perhaps both of the fingers may effect a slight shift in the angular position of the disc. This facility is of importance, but the extent of angular displacement is so small as merely to serve in rounding off true weight values, and not so great as to create an undesirably inaccurate weight recording. However, in connection with this characteristic of the combination it is greatly preferred that there be no restraint, braking or locking effect on the indicator shaft or its appurtenances; otherwise expressed, it is greatly preferred that the present combination include a locating disc which is free to be slightly angularly displaced at the time of its engagement by parts of one or both of the alignment fingers 15 and 40. This feature is herein noted, since certain attempts have heretofore been made toward evolving a weight mechanism for use in connection with a locating disc or the like constrained to a fixed position prior to application of the locating fingers thereto. For convenience of reference and purposes of claim, the freely angularly shiftable dial shaft and locating disc are herein referred to as a "floating" disc arrangement.

It has been found in practice and commercial usage that the paired, partly independently movable and coacting fingers such as 15 and 40, serve fully to overcome the difficulties hereinabove noted, and assuming correct adjustments, will serve dependably to prevent inaccurate recording of weight values on the scale.

Although the invention has been described by making a detailed reference to a selected and preferred embodiment of the invention, many changes may be made within the intendment of the appended claims, without departing from the full and intended scope of the invention.

I claim:

1. In set-up mechanism for recording-type scales, a locating disc of floating type, having a serrate periphery, a locating finger assembly coacting with the periphery of the disc for fixing the weight values to be derived by the recording mechanism, the finger assembly including an elongated main finger and an elongate auxiliary finger, the fingers being arranged in slightly spaced, substantially parallel relation, the main finger having a plurality of edge portions, and the auxiliary finger provided with a single such edge portion, the serrate periphery of the locating disc being characterized by a plurality of evenly spaced peripheral teeth and intervening notches, the edge portions of the fingers being arranged to coact with the teeth and notches on the locating disc, an operating member, operatively connected to both the main finger and the auxiliary finger, and arranged positively to propel and retract the fingers, toward and from the locating disc, at desired times, a guide embracing and common to both fingers, but arranged to permit a slight convergence of the fingers therein, and a spring between and abutting the fingers, tending to bias the fingers into substantial parallelism and yet yieldably permitting their convergence within the guide.

2. In set-up mechanism for recording-type scales, a locating disc of floating type, having a serrate periphery, a locating finger assembly coacting with the periphery of the disc for fixing the weight values to be derived by the recording mechanism, the finger assembly including a pair of elongate, substantially parallel, slightly spaced fingers each provided with an apexed end portion adapted to coact with the serrate periphery of the locating disc, means for guidingly engaging the fingers to determine their maximum spacing, and spring means between the fingers permitting their apexed portions to assume various space relations intermediate their maximum spacing.

3. In set-up mechanism for recording-type scales, a locating disc of floating type, having a serrate periphery, a locating finger assembly coacting with the periphery of the disc for fixing the weight values to be derived by the recording mechanism, the finger assembly including a pair of alignment fingers each having an apexed end portion coacting with the serrate periphery of the disc in fixing its position preparatory to a recording operation, members guidingly constraining the fingers to reciprocal movement along substantially rectilinear, parallel paths, and means yieldably permitting slight convergence of the fingers.

4. In an alignment finger assembly for use with a star wheel or like element in recording-type scales, a pair of reciprocally mounted alignment fingers, both adapted to coact with the star wheel and having formed end portions coacting with the star wheel periphery, spring means disposed between and in engagement with the fingers, tending to maintain the fingers in spaced parallel relation and yet permit a yieldable divergence thereof, and adjusting means permitting the fingers to be relatively set so that one thereof projects appreciably forwardly of the other, in a direction toward the star wheel.

5. Alignment mechanism for use with a floating star wheel in the set-up mechanism of recording-type scales, said mechanism including a pair of elongate, parallel, cooperating alignment fingers formed to present a plurality of apexed portions to the periphery of the star wheel, means for guiding the fingers to permit their reciprocal movement to and from the star wheel, a common operating arm for the fingers, and independent connections from the arm to the respective fingers, including a pivotal connection from the arm to one of the fingers, and a lost-motion pivotal connection between the arm and the other finger, the last said connection enabling a limited reciprocal movement of said other finger, free of corresponding movement of the arm.

6. In a set-up mechanism for recording-type scales, and in combination with a locating disc of floating type characterized by a plurality of evenly spaced teeth and intervening notches on its periphery, a locating finger assembly adapted to coact with the notches and recesses of the disc for fixing the weight values to be derived by the recording mechanism, the locating finger assembly including a main reciprocal finger having a pyramidal end portion formed to present a double edge toward the periphery of the locating disc, the two edges of the main finger being spaced dissimilarly to the spacing of teeth on the locating disc, an auxiliary locating finger spaced from but normally parallel to the main finger, and provided with a pyramidal end portion terminating in a single apex presented toward the locating disc, a guide structure near the disc, common to the main and auxiliary locating fingers, a light leaf spring between the fingers, tending to keep their operative end portions in spaced but substantially parallel relation, an operating arm near the opposite ends of the main and auxiliary fingers, a pivot pin connection between the operating arm and the auxiliary finger, and a pivot-pin-and-slot connection between the operating arm and main finger, adjusting means between the ends of at least one of the fingers, for effecting changes in the effective lengths of the finger thus equipped, the relative effective length and setting of the fingers being such that the main finger normally projects appreciably farther toward the locating disc than the auxiliary finger.

JAMES E. BUTLER.